US012525393B2

(12) United States Patent
Akdogan et al.

(10) Patent No.: US 12,525,393 B2
(45) Date of Patent: Jan. 13, 2026

(54) PRODUCTION OF $Fe_{16}N_2$ COMPOUND AS A PERMANENT MAGNET

(71) Applicants: BAHCESEHIR UNIVERSITESI, Istanbul (AR); PIRI REIS UNIVERSITESI, Istanbul (TR)

(72) Inventors: Ozan Akdogan, Istanbul (AR); Nilay Gunduz Akdogan, Istanbul (AR); Onur Zirhli, Istanbul (AR)

(73) Assignees: BAHCESEHIR UNIVERSITESI, Istanbul (TR); PIRI REIS UNIVERSITESI, Istanbul (TR)

( * ) Notice: Subject to any disclaimer, the term of this patent is extended or adjusted under 35 U.S.C. 154(b) by 798 days.

(21) Appl. No.: 17/770,646

(22) PCT Filed: Nov. 30, 2020

(86) PCT No.: PCT/TR2020/051192
§ 371 (c)(1),
(2) Date: Apr. 21, 2022

(87) PCT Pub. No.: WO2021/112799
PCT Pub. Date: Jun. 10, 2021

(65) Prior Publication Data

US 2022/0406521 A1 Dec. 22, 2022

(30) Foreign Application Priority Data

Dec. 4, 2019 (TR) ................................ 2019/19257

(51) Int. Cl.
*H01F 41/02* (2006.01)
*H01F 1/113* (2006.01)

(52) U.S. Cl.
CPC ......... *H01F 41/0253* (2013.01); *H01F 1/113* (2013.01)

(58) Field of Classification Search
CPC ...... H01F 41/0253; H01F 1/113; H01F 1/065; H01F 1/083
See application file for complete search history.

(56) References Cited

U.S. PATENT DOCUMENTS

2014/0294657 A1* 10/2014 Yamamoto .............. H01F 1/083 148/230
2018/0117818 A1* 5/2018 Paranthaman ...... H01F 41/0253

FOREIGN PATENT DOCUMENTS

| | | | |
|---|---|---|---|
| EP | 2666563 | A1 | 11/2013 |
| EP | 2760033 | A1 | 7/2014 |
| JP | H09162019 | A | 6/1997 |
| JP | 2013080922 | A | 5/2013 |
| JP | 6155440 | B2 | 7/2017 |

* cited by examiner

*Primary Examiner* — Anthony J Zimmer
(74) *Attorney, Agent, or Firm* — Bayramoglu Law Offices LLC

(57) ABSTRACT

A production method of a $Fe_{16}N_2$ based permanent magnet includes the following steps: 1) obtaining a $Fe_{16}N_2$ compound in a form of micro flakes by applying a nitriding process to α'-Fe powders of micro or nano sizes; 2) forming a structure by combining a polymer material with the $Fe_{16}N_2$ compound and utilizing a 3D printer; and 3) applying a magnetization process to the structure obtained in step 2 to obtain a magnetized structure and carrying out a heat treatment process to the magnetized structure to obtain the $Fe_{16}N_2$ based permanent magnet. The production method is continuous, less difficult, and less costly compared to the production of previous permanent magnets.

14 Claims, No Drawings

PRODUCTION OF $Fe_{16}N_2$ COMPOUND AS A PERMANENT MAGNET

CROSS REFERENCE TO THE RELATED APPLICATIONS

This application is the national phase entry of International Application No. PCT/TR2020/051192, filed on Nov. 30, 2020, which is based upon and claims priority to Turkish Patent Application No. 2019/19257, filed on Dec. 4, 2019, the entire contents of which are incorporated herein by reference.

TECHNICAL FIELD

The invention relates to the synthesis of $Fe_{16}N_2$ ferromagnetic compound and the production of permanent magnet using 3D printer.

BACKGROUND

Although energy resources decrease continuously, the requirements increase rapidly, thus this makes it necessary to search for new energy resources and use the available ones in the most efficient manner.

The generators and motors that provide electromechanical energy transformation play a very important role in energy consumption and production. For this reason, increasing the efficiency in the generators and motors is important to deal with climate change and to fulfill the increasing energy requirements.

A magnet that can preserve its magnetic properties for a long time is called a permanent magnet. Permanent magnet technology is a developing field that can be used in generators and motors. When we consider the energy efficiency solutions in generators and motors, electromechanical power transformation based on permanent magnet technology becomes inevitable.

The permanent magnet is made of ferromagnetic materials that are magnetized by a strong external magnetic field. The magnetic moments of all atoms in ferromagnetic materials are directed in the same direction by using a strong magnetic field.

The materials that are used as magnetizers and electromagnets are generally soft magnets. The polarity of the permanent magnet does not change, and the polarity of the soft magnet changes with the polarity of the applied magnetic field.

The permanent magnets included within the literature are made of lanthanides, which are expensive, limited in nature and harmful to nature due to its mining process. Lanthanide-containing magnet powders require an expensive and long process to be transformed to final product.

In the literature, the highest magnetic energy density of the permanent magnets produced failed to satisfy the requirements for the relevant sectors and is limited to 60 MGOe.

In conclusion, rather than permanent magnets that are obtained by costly and difficult production processes and do not have sufficient magnetic power; the production of permanent magnet, which is continuous, less difficult, and less costly compared to the production of previous permanent magnets, is supposed to provide advantage for the relevant technical field.

SUMMMARY

The present invention is related to the production of a permanent magnet in order to eliminate the abovementioned disadvantages and to bring new advantages to the relevant technical field.

The main aim of the invention is to provide a permanent magnet having high magnetic energy density.

Another main aim of the invention is to provide a permanent magnet production process that provides continuous production and is applicable to industry.

Another aim of the invention is to provide a permanent magnet that can be produced in required dimensions and forms.

The invention is related to a permanent magnet and production thereof so as to fulfill all aims mentioned above and will be obtained from the following detailed description. Thus, the permanent magnet contains $Fe_{16}N_2$ ferromagnetic compound. Therefore, the production of a permanent magnet having high magnetic energy density is provided. The production of said permanent magnet is characterized by the following process steps:

i. Obtaining the chemical compound $Fe_{16}N_2$ in the form of micro flakes by applying nitriding process to the micron or nano-sized α'-Fe powders,
ii. Forming a structure by combining polymer material with $Fe_{16}N_2$ compound by utilizing a 3D printer,
iii. Applying the magnetization process to the chemical compound obtained in step (ii) and carrying out heat treatment processes.

In a possible embodiment of the invention, α'-Fe powders mentioned in step (i) have a thickness between 50 nm and 150 nm.

In a possible embodiment of the invention, the α'-Fe powders that are used in step (i) have diameter between 5 and 15 μm.

In a possible embodiment of the invention, in step (i), powders containing α'-Fe are also exposed to processes for flaking with auxiliary surfactants and/or solvents.

The possible embodiment of the invention is that said flaking process is carried out in the ball mill device for a period of 10 to 14 hours.

The nitriding process mentioned in step (i) is performed at a temperature in the range of 150 to 190° C.

A possible embodiment of the invention is that the nitriding process mentioned in step (i) is performed between 24 to 160 hours.

A possible embodiment of the invention is that the nitriding process mentioned in step (i) is performed with ammonia gas.

A possible embodiment of the invention is that the polymer material stated in step (ii) is one of the chemical compounds SU8, PETA, LAP, PVP, polyurethane and PVDF or mixtures thereof in certain weight ratios.

A possible embodiment of the invention is that in step (ii), SU8 chemical compound is used as the polymer material.

A possible embodiment of the invention is that polymer material with a value of 10 to 40% by weight is added to the $Fe_{16}N_2$ compound to be subjected to step (ii).

A possible embodiment of the invention is that in step (ii), annealing process under vacuum is also applied at a temperature between 100 and 200° C.

A possible embodiment of the invention is that said annealing process is carried out for 3 to 7 hours.

A possible embodiment of the invention is that the magnetization processes stated in step (iii) are performed with an electromagnet with a magnetic field of 1 to 2 Tesla.

A possible embodiment of the invention is that the magnetization process is carried out between 1 minute and 2 minutes.

A possible embodiment of the invention is that the $Fe_{16}N_2$ ferromagnetic compound obtained is mixed with a polymer material. Therefore, an elastic structure and mechanically durable structures are obtained.

DETAILED DESCRIPTION OF THE EMBODIMENTS

In this detailed description of the invention, a permanent magnet whose continuous production can be provided, which is less difficult and costly compared to the production routes of permanent magnets, thereof is described only for clarifying the subject matter and in a manner such that no limiting effect is created.

So as to produce the permanent magnet mentioned in the invention, a permanent magnet is obtained by applying nitriding processes to α'-Fe powders and by applying magnetization processes to the $Fe_{16}N_2$ compound obtained after nitriding process. The following process steps are applied so as to obtain permanent magnet with required properties and structures:

i. Obtaining the chemical compound $Fe_{16}N_2$ in the form of micro flakes by applying nitriding process to the materials that contain micron or nano-sized α'-Fe powders,
ii. Forming a structure by 3D printing a polymer material with $Fe_{16}N_2$ compound,
iii. Applying the magnetization process to the chemical compound obtained in step (ii) and carrying out heat treatment processes.

Before applying step (i), α'-Fe powders are turned into micron-sized flakes by means of the ball milling technique containing surfactant. Said ball milling process is continued for 10 to 14 hours. Anisotropic material is obtained in magnet production by flaking α'-Fe powders. Moreover, when the surface area of α'-Fe powders increases, the nitriding process will be more efficient. Subsequently, process of cleaning α'-Fe powders from foreign materials on the surface is carried out. Said surface cleaning processes are performed at 300 to 500° C. for 1 to 4 hours.

The nitriding process stated in step (i) is performed under powder ammonia gas. The nitriding processes of the α'-Fe powders exposed to surface cleaning processes are performed at a temperature range between of 150 to 190° C. for 24 to 160 hours.

A prototype material in the dimensions and form required by the end user can be produced with the process of 3D printer shaping stated in step (ii). Polymer material with a value of 10 to 40% by weight is added to the $Fe_{16}N_2$ compound to be subjected to step (ii).

The polymer material stated in step (ii) is one of the chemical compounds SU8, PETA, LAP, PVP, polyurethane and PVDF or mixtures thereof in certain weight ratios.

UV curable SU8 chemical compound is selected as the polymer material.

In step (ii), a vacuum annealing process is applied at a temperature between 100 and 200° C. in order to ensure that the $Fe_{16}N_2$ compound obtained in the desired structures with the 3D printer can solidify and maintain its volume. Said annealing process is carried out for 3 to 7 hours.

The magnetization processes stated in step (iii) are performed with an electromagnet with a magnetic field of 1 to 2 Tesla. The magnetization process is carried out between 1 minute and 2 minutes.

In step (iii), heat treatment is applied to obtain the $Fe_{16}N_2$ magnet after magnetization permanent. Said heat treatments are carried out at a temperature between 100 and 200° C. and are applied for 3 to 7 hours.

The protection scope of the invention is specified in the appended claims and cannot be limited to the description made for illustrative purposes in this detailed description.

Likewise, it is clear that a person skilled in the art can present similar embodiments in the light of the above descriptions without departing from the main theme of the invention.

What is claimed is:

1. A production method of a $Fe_{16}N_2$ based permanent magnet, comprising:

1) obtaining a $Fe_{16}N_2$ compound in a form of micro flakes by applying a nitriding process to α'-Fe powders of micro or nano sizes;
2) forming a structure by combining a polymer material with the $Fe_{16}N_2$ compound and utilizing a 3D printer; and
3) applying a magnetization process to the structure obtained in step 2 to obtain a magnetized structure and carrying out a heat treatment process to the magnetized structure to obtain the $Fe_{16}N_2$ based permanent magnet, wherein the heat treatment process is applied at 150° C. to 200° C. and for 3 to 7 hours.

2. The production method according to claim 1, wherein the α'-Fe powders in step 1 have a thickness between 50 nm and 150 nm.

3. The production method according to claim 1, wherein the α'-Fe powders in step 1 have a diameter between 5 and 15 μm.

4. The production method according to claim 1, wherein step 1 comprises performing a flaking process with auxiliary surfactants and/or solvents to the α'-Fe powders.

5. The production method according to claim 4, wherein the flaking process is carried out in a ball mill device for a period of 10 to 14 hours.

6. The production method according to claim 1, wherein the nitriding process in step 1 is performed at a temperature range of 150 to 190° C.

7. The production method according to claim 1, wherein the nitriding process in step 1 is performed between 24 to 160 hours.

8. The production method according to claim 1, wherein the nitriding process in step 1 is performed with ammonia gas.

9. The production method according to claim 1, wherein the polymer material in step 2 is at least one polymer selected from the group consisting of SU8, PETA, LAP, PVP, polyurethane, and PVDF.

10. The production method according to claim 9, wherein the polymer material is SU8.

11. The production method according to claim 1, wherein in step 2, when combining the polymer material with the $Fe_6N_2$ compound, the polymer material has a weight percentage of 10-40% in a combination of the polymer material and the $Fe_6N_2$ compound.

12. The production method according to claim 1, wherein the heat treatment process is applied under vacuum.

13. The production method according to claim 1, wherein in step 3, the magnetization process is performed with an electromagnet with a magnetic field of 1 to 2 Tesla.

14. The production method according to claim 13, wherein the magnetization process is carried out between 1 minute and 2 minutes.

* * * * *